United States Patent Office 3,480,423
Patented Nov. 25, 1969

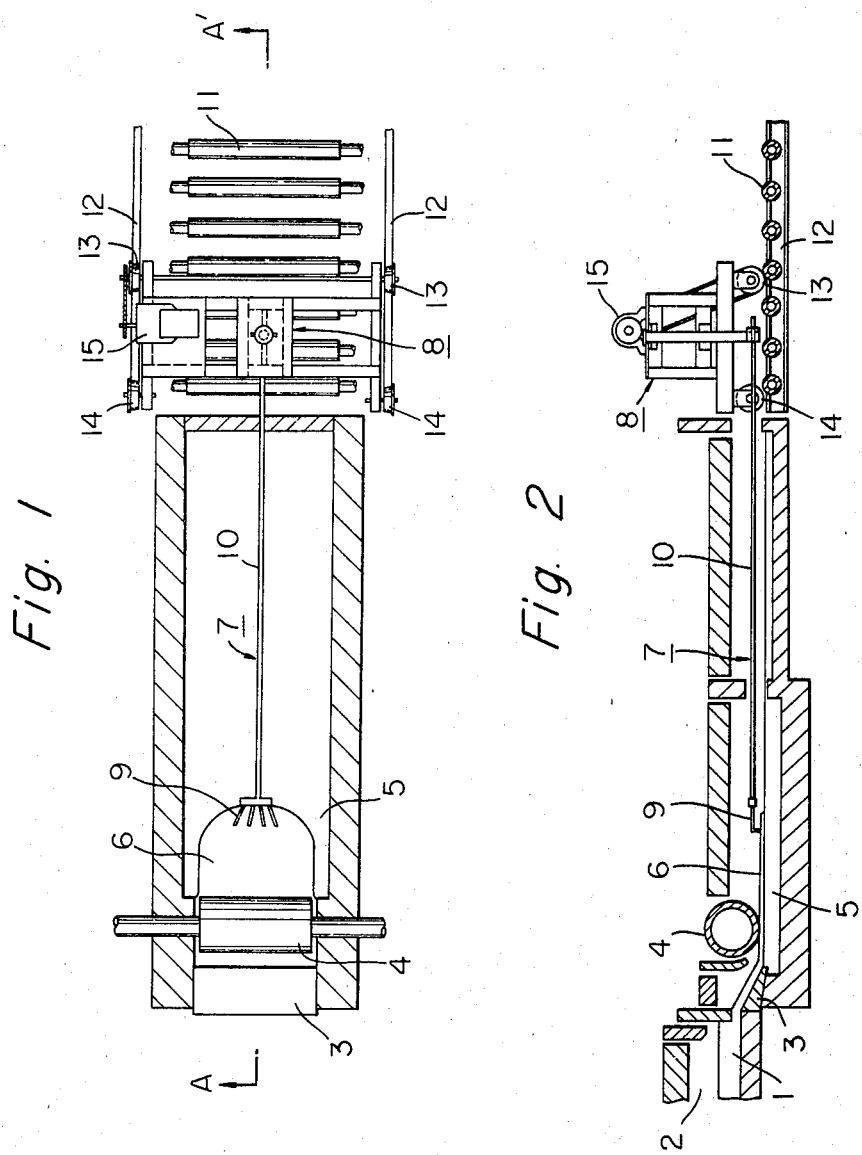

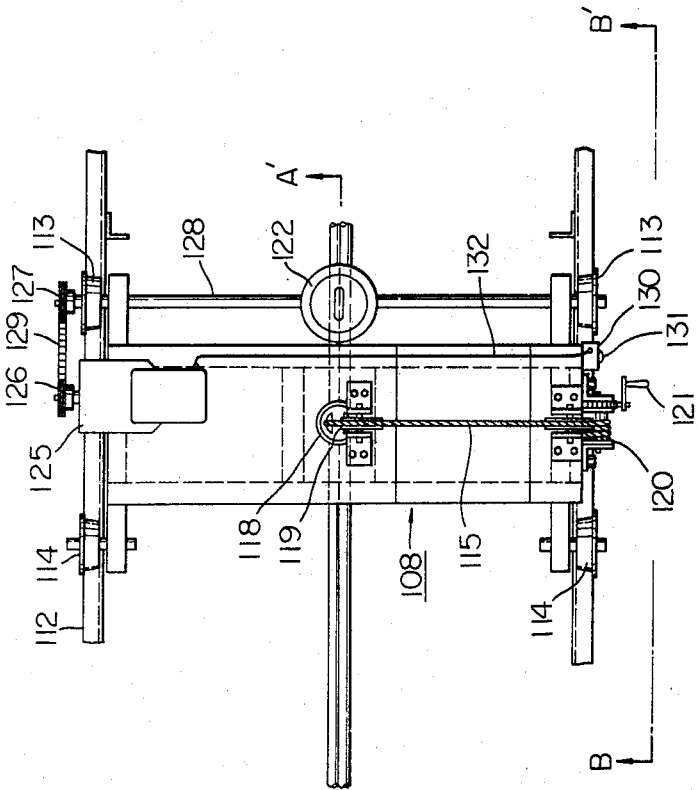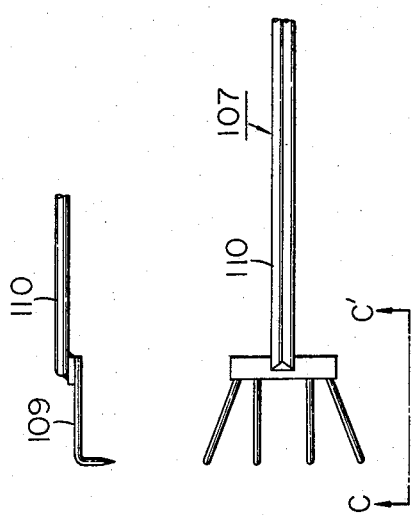

3,480,423
BAIT APPARATUS FOR DRAWING OUT GLASS RIBBONS FROM MOLTEN BATH
Kiyoshi Itakura, Higashinada-ku, Kobe, Japan, assignor to Nippon Sheet Glass Co., Ltd., Osaka, Japan
Filed Oct. 3, 1966, Ser. No. 583,716
Claims priority, application Japan, Oct. 12, 1965, 40/62,114
Int. Cl. C03b 18/02
U.S. Cl. 65—182                     5 Claims

ABSTRACT OF THE DISCLOSURE

Apparatus for drawing molten glass into continuous sheet form on a molten bath, and having apparatus mounted on a track longitudinally adjacent to the bath for both drawing the glass horizontally and to simultaneously slightly raise it while in a substantially horizontal plane to place it onto driven conveying rollers.

---

This invention relates to an apparatus for drawing out glass ribbons in an apparatus by which sheet glass is continuously manufactured employing a bath of molten metal.

In manufacturing sheet glass continuously by flowing molten glass onto a bath of molten metal and advancing it thereover, when first flowing the molten glass onto the metal bath, the molten glass has a tendency to just spread out in all directions. And since there is no force acting on it to effect its forward movement, there is a need to advance the glass ribbon by means of an external force and to place it onto drive rolls that are disposed externally of the bath at a point adjacent to the exit of the metal bath.

This invention therefore relates to an apparatus which draws out the molten glass after being flowed out onto a molten metal bath to thereby form the molten glass into a continuous glass ribbon and to then slightly raise and place the forward end of the glass ribbon onto rolls provided externally of the bath at a point adjacent to the exit thereof. By means of these rolls the glass ribbon is conveyed forward. The apparatus comprises a catching or so-called bait member for seizing the molten glass which has flowed onto said bath, and means coupled to said catching member and adapted to move the latter along the longitudinal direction of said bath.

The means for moving the catching member longitudinally of the bath comprises a pair of rails disposed in parallel to the longitudinal direction of the bath, a framework capable of movement over said rails, said framework being coupled with the aforesaid catching member, and a drive means for moving said framework over the rails longitudinally of the bath. The framework is provided with further means by which the catching member can be moved up and down.

Figure 4:
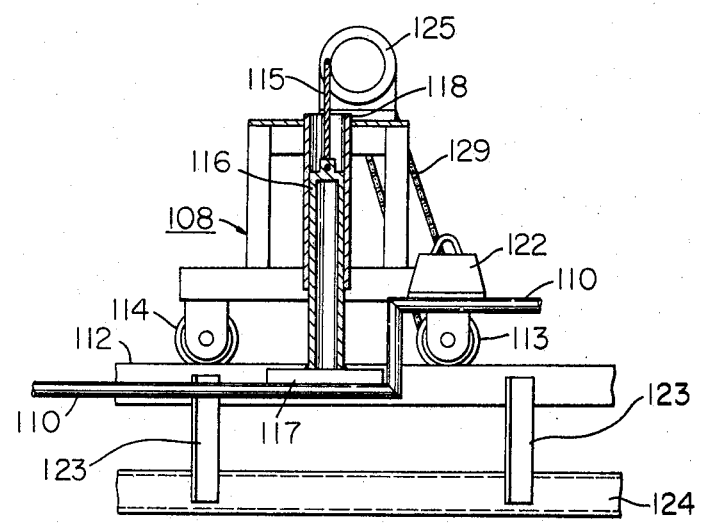
Figure 5:
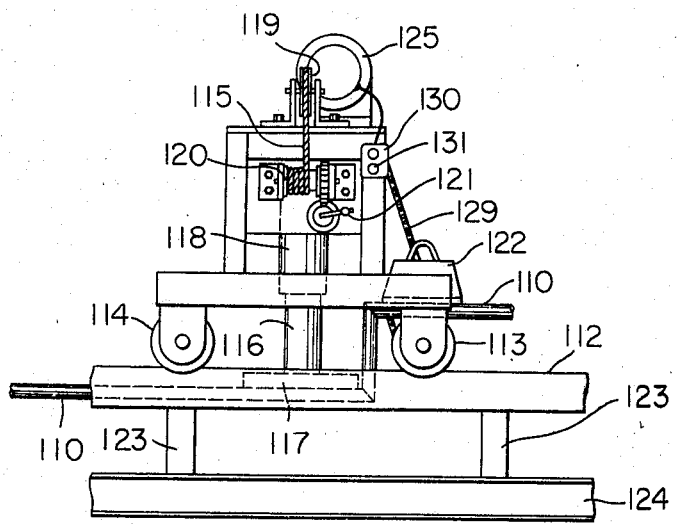

Referring to the accompanying drawings, FIGURE 1 is a plain view illustrating one example of a sheet glass manufacturing apparatus which is equipped with the glass ribbon drawing out apparatus according to this invention, FIGURE 2 being a side view in vertical section taken along line A–A' of FIGURE 1; and FIGURE 3 is a larger scale, plan view of a specific example of a glass ribbon drawing out apparatus of this invention; FIGURE 4 being a sectional view taken along line A–A' of FIGURE 3, FIGURE 5 being a side view of the apparatus of FIGURE 3 as viewed from the line B–B' and FIGURE 6 being a side view of apparatus of FIGURE 3 as viewed from line C–C'.

In FIGURES 1 and 2 the molten glass 1 flows from a forehearth 2 of a melting furnace down a lip tile 3 whose upper surface is inclined and thence delivered to a sizing means consisting of a sizing roll 4 and a molten metal bath 5 where is is sized and becomes a glass ribbon 6. The glass ribbon drawing out apparatus consists of a catching member 7 of rakelike shape and a drive member 8 which drives the catching member 7. The catching member 7 is, in turn, made up of a catching hook 9 at its distal end and a supporting rod 10 for holding the catching hook 9. Wheels 13, 14 of the drive member 8 straddle rails 12 disposed at the outsides of the rolls for conveying the glass. Wheel 13 is driven by a motor 15 equipped with a infinitive variable speed means. The drive member 8 can be moved at a desired speed in the direction of the advance of the glass along with the catching member 7. Again, the drive member is equipped with a means (not shown) whereby the catching member can be moved up and down.

When the manufacture of sheet glass is to be begun, the glass ribbon drawing out apparatus, as shown in the drawings, is positioned at a point nearest to the forehearth. When the front end of the sized glass ribbon advances and comes to a point below the catching member of the glass drawing out apparatus, the catching member is lowered by the up and down movement means, thus catching the front end of the glass ribbon with its catching hook. At the same time, the motor of the drive member is operated and the catching member is driven at a desired speed in the advancing direction of the glass. Hence, the glass ribbon advances with a pulling force being exerted upon it. When the front end of the glass ribbon reaches the exit of the metal bath, the front end of the glass ribbon, along with the catching member, advances while being lifted up slightly by the up and down movement means, thus becoming placed atop the drive rolls. When the glass ribbon has become such that it advances by being pulled with the drive rolls 11 only, the catching member is unhooked from the front end of the glass ribbon.

Further details of the invention glass ribbon drawing out apparatus are illustrated in FIGURES 3–6.

The catching member 107 consists of a hook 109 and a supporting rod 110. The hook 109 which is made of heat-resisting steel is welded at its base to the distal end of the supporting rod 110. The supporting rod 110 is a hollow pipe whose inside is cooled with water.

On the other hand, the member 108 which serves to move the catching member 107 along the longitudinal direction of the bath is a framework having a pair of front wheels 113 and a pair of rear wheels 114, which roll over a pair of rails 112. The aforesaid supporting rod 110 of the catching member 107 is attached through the intermediary of a supporting plate 117 to a suspended pipe 116 depending from the member 108 by means of a rope 115. The suspended pipe 116 fits in a sleeve 118 which is supported fixedly vertically in the member 108. Hence the pipe 116 is capable of telescopic sliding movements up and down inside the inner wall of the sleeve 118. The rope 115 is wound up on a winch 120 via a pulley 119, and hence by operation of a winch handle 121 the suspended pipe 116, and consequently the attached catching member 107, can be moved upwardly or downwardly and at the same time can be maintained at a desired height. Further, a counterweight 122 is loaded at the other end of the supporting rod 110 so as to prevent the weight of the hook 109 and the supporting rod 110 to exert a bending moment on the suspended pipe 116, an adjustment being made to ensure that the center of gravity of the whole falls below the suspended pipe 116.

The foregoing pair of rails 112, which are disposed to the outsides of rolls 11 which in turn, are provided externally of the molten metal bath at a point adjacent to the exit thereof and serve to convey the glass ribbon, are for moving the aforesaid member 108 along the molten metal bath and are supported by supporting beams 124 by way of vertical members 123. On the other hand, a motor 125 equipped with an infinitive variable speed means is installed in the member 108, for driving wheels 113 of the member 108. 126 is a sprocket wheel that the motor 125 is equipped with, while 127 is a sprocket wheel secured to a shaft 128 of the wheels 113, 129 being a chain which links the sprocket wheels 126 and 127, 130 being a switch for controlling the motor 125, 131 being its push butttton and 132 an insulated electric cable. By operating the push button 131 of the switch 130 it is possible to move the member 108, and hence the catching member 107, at a desired speed over the rails 112.

When the invention apparatus is employed, the glass ribbon upon being flowed onto the molten metal bath can be pulled at a desired speed, and thus no irregularities occur in the width and thickness of the glass ribbon. Hence, sheet glass of good quality can be obtained within a short period after commencing the manufacturing operation. Further, when the invention apparatus is used, the front end of the glass ribbon is continuously being hooked by the catching member during its advance, and consequently it is possible to place it readily upon the drive rolls without causing any damage to the glass ribbon. Further, there is the advantage that not much manual labor is required when using this apparatus and also that it can be operated without the need of any skill.

The catching member of the glass ribbon drawing out apparatus is not restricted to the hereinbefore-described rakelike means but may also be one which is kept submerged in the metal bath and adapted to hook the front end of the glass ribbon from its underside. In short, it will do if it is provided with a hooking means which engages the glass to such an extent that it does not come loose from the glass ribbon when pulling it along the metal bath, and a rod, wire or other means for transmitting the drive from the drive member to the hooking means. Further, the drive member of the glass ribbon drawing out apparatus is not restricted to the construction hereinbefore described. For instance, it may be of a construction in which the body proper of the drive member is kept stationary while the catching member is caused to be moved along the metal bath in the direction of the advance of the glass ribbon.

I claim:

1. An apparatus for drawing out molten glass into horizontal continuous flowing sheet or ribbon form upon a molten metal bath, and to subsequently slightly raise and place the forward end of the ribbon onto raised conveying rolls disposed with the conveying surface longitudinally adjacent of the bath and coplanar with a raised exit end thereof for conveying said ribbon horizontally forward, said apparatus comprising in combination a bait or catching member for seizing the molten glass which has flowed onto a receiving end of said bath; a pair of generally horizontal rails disposed parallel to the longitudinal direction of the bath; a framework including means to enable its movement along said rails; means to support and couple said catching member to the said framework; drive means for moving said framework along said rails to thereby move said catching member in the longitudinal direction of the bath; and means for moving said bait or catching member upwardly and downwardly to facilitate raising of the molten glass ribbon while substantially horizontal by said catching member when the flowing end of the glass ribbon reaches the exit end of the bath.

2. An apparatus as defined in claim 1 wherein said bait or catching member comprises a hook having pointed protrusions extending substantially vertical to the plane of the glass ribbon, and including a supporting rod of a hollow pipe, one end of which is connected to said hook; said rod being coupled with said framework towards the other end; and cooling means operatively connected with said latter end of the hollow support rod.

3. An apparatus as defined in claim 2 wherein said cooling means includes water-feeding and water-discharging means disposed externally of the molten bath; and said means for moving said bait upwardly and downwardly is related to the drive means and comprises a rope connected with said supporting rod and a winch for winding up said rope, said rope and winch being disposed on said framework.

4. An apparatus as defined in claim 3 wherein a counter weight is loaded on the side of the supporting rod opposite to said hook with respect to said drive means.

5. An apparatus as defined in claim 1 wherein said pair of rails are disposed laterally to the outside of said rolls which convey the ribbon forward and at a point longitudinally adjacent to the exit of the bath.

References Cited

UNITED STATES PATENTS

| | | | |
|---|---|---|---|
| 789,911 | 5/1905 | Hitchock | 65—182 |
| 1,119,007 | 12/1914 | Frink | 65—353 XR |
| 1,224,032 | 4/1917 | Spinasse | 65—353 XR |
| 1,887,414 | 11/1932 | Le Roy | 65—353 XR |
| 3,351,446 | 11/1967 | Pilkington et al. | 65—182 |

FRANK W. MIGA, Primary Examiner

U.S. Cl. X.R.

65—352